US012789269B2

(12) United States Patent
Halili et al.

(10) Patent No.: US 12,789,269 B2
(45) Date of Patent: Nov. 10, 2026

(54) REVERSE COUNTERSINK CUTTING ASSEMBLIES, REVERSE COUNTERSINKING ASSEMBLIES AND METHODS FOR REVERSE COUNTERSINKING A THROUGH HOLE IN A WORKPIECE

(71) Applicant: The Boeing Company, Arlington, VA (US)

(72) Inventors: Florante M. Halili, Renton, WA (US); Matthew G. Kesterson, Everett, WA (US); Steven L. Harman, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 439 days.

(21) Appl. No.: 18/479,199

(22) Filed: Oct. 2, 2023

(65) Prior Publication Data

US 2025/0108444 A1 Apr. 3, 2025

(51) Int. Cl.
*B23B 51/10* (2006.01)
*B23B 35/00* (2006.01)

(52) U.S. Cl.
CPC .............. *B23B 51/10* (2013.01); *B23B 35/00* (2013.01)

(58) Field of Classification Search
CPC ......... B23B 51/10; B23B 51/00; B23B 35/00; B23B 2251/52; B23B 51/104; B23B 2251/00

(Continued)

(56) References Cited

U.S. PATENT DOCUMENTS 2,308,447 A * 1/1943 Greenbaum .......... B23B 51/104 408/113
2,383,854 A * 8/1945 Gwinn, Jr. ............ B23B 51/104 408/112

(Continued)

FOREIGN PATENT DOCUMENTS

DE 102016109309 A1 11/2017
KR 100552830 B1 2/2006

OTHER PUBLICATIONS

European Patent Office, Extended European Search Report, App. No. 24186259.8 (Jan. 20, 2025).

(Continued)

*Primary Examiner* — Lawrence Averick
(74) *Attorney, Agent, or Firm* — Walters & Wasylyna LLC

(57) ABSTRACT

A reverse countersink cutting assembly includes a countersink cutting head, a depth stop sleeve and a fastener. The countersink cutting head includes a cutter distal portion, a cutting portion and a cutter proximal portion axially spaced along a longitudinal axis. The cutting portion defines a countersink cutting range. The depth stop sleeve includes a central cavity that coaxially receives the cutter proximal portion of the countersink cutting head. The depth stop sleeve also includes one or more projections that extend coaxially along the longitudinal axis to a predetermined point within the countersink cutting range to define a depth of cut for the reverse countersink cutting assembly. The fastener retains the depth stop sleeve on the countersink cutting head. A reverse countersinking assembly includes a pull shank assembly and the reverse countersink cutting assembly. A method for reverse countersinking a through hole in a workpiece is also disclosed.

20 Claims, 16 Drawing Sheets

(58) Field of Classification Search
USPC .......................................................... 408/1 R
See application file for complete search history.

(56) References Cited

U.S. PATENT DOCUMENTS

| | | | | | |
|---|---|---|---|---|---|
| 2,804,789 | A * | 9/1957 | Randles | B23B 51/10 408/143 |
| 3,248,975 | A * | 5/1966 | Breuning | B23B 51/10 140/3 R |
| 2004/0144187 | A1* | 7/2004 | Abele | B62D 6/10 73/866.5 |
| 2017/0274459 | A1* | 9/2017 | Rebholz | B23B 51/104 |
| 2022/0331894 | A1* | 10/2022 | Beer | B23G 1/16 |
| 2024/0227038 | A1* | 7/2024 | Anchique | B23B 51/08 |

OTHER PUBLICATIONS

McMaster-Carr: "Reverse Countersinks,". https://www.mcmaster.com/products/reverse-coutnersinks/.
MSC Industrial Supply: "Reverse Countersinks," Big Book Catalog, https://www.mscdirect.com/browse/tn/Holemaking/Countersinks-Chamfer-Mills-Back-Chamfers/Countersinks-Sets/Reverse-Countersinks?navid=210 . . . .

* cited by examiner

REVERSE COUNTERSINK CUTTING ASSEMBLIES, REVERSE COUNTERSINKING ASSEMBLIES AND METHODS FOR REVERSE COUNTERSINKING A THROUGH HOLE IN A WORKPIECE

FIELD

The present disclosure relates generally to techniques for reverse countersinking a through hole in a workpiece and, particularly, when the working side of the through hole is in a confined space or in a limited space. Various examples of a reverse countersink cutting assembly for use in the reverse countersinking are disclosed. Similarly, various examples of a reverse countersinking assembly to perform reverse countersinking are disclosed.

BACKGROUND

Performing reverse countersinking in a confined space is a challenge. Reverse countersinking in a limited space can also be a challenge. In existing tools, the depth of cut for reverse countersinks is controlled by the operator and can be inconsistent. The cut finish for reverse countersinks using existing tools can also be inconsistent.

Accordingly, those skilled in the art continue with research and development efforts to improve reverse countersinking techniques.

SUMMARY

Disclosed are examples of reverse countersink cutting assemblies, reverse countersinking assemblies and methods for reverse countersinking a through hole in a workpiece. The following is a non-exhaustive list of examples, which may or may not be claimed, of the subject matter according to the present disclosure.

In an example, the disclosed reverse countersink cutting assembly includes a countersink cutting head, a depth stop sleeve and a fastener. The countersink cutting head defines a longitudinal axis extending from a cutter distal end through a cutter proximal end. The countersink cutting head includes a cutter distal portion, a cutting portion and a cutter proximal portion axially spaced along the longitudinal axis. The cutting portion defines a countersink cutting range. The depth stop sleeve includes a central cavity that coaxially receives the cutter proximal portion of the countersink cutting head. The depth stop sleeve also includes one or more projections that extend coaxially along the longitudinal axis to a predetermined point within the countersink cutting range to define a depth of cut for the reverse countersink cutting assembly. The fastener retains the depth stop sleeve on the countersink cutting head.

In an example, the disclosed reverse countersinking assembly includes a pull shank assembly and a reverse countersink cutting assembly. The reverse countersink cutting assembly includes a countersink cutting head, a depth stop sleeve and a fastener. The pull shank assembly defines a longitudinal axis extending from a shank distal end through a shank proximal end. The pull shank assembly includes a shank distal portion, a shank extension portion and a shank proximal portion axially spaced along the longitudinal axis. The reverse countersink cutting assembly is at least temporarily attached to the pull shank assembly. The countersink cutting head includes a cutter distal end, a cutter distal portion, a cutting portion, a cutter proximal portion and a cutter proximal end axially spaced along the longitudinal axis. The cutting portion defines a countersink cutting range. The cutter distal end includes a first central cavity that receives the shank proximal portion of the pull shank assembly. The depth stop sleeve includes a second central cavity that receives the cutter proximal portion of the countersink cutting head and further includes one or more projections that extend coaxially along the longitudinal axis to a predetermined point within the countersink cutting range to define a depth of cut for the reverse countersink cutting assembly. The fastener retains the depth stop sleeve on the countersink cutting head.

In an example, the disclosed method for reverse countersinking a through hole in a workpiece includes: (1) retaining a depth stop sleeve on a countersink cutting head to form a reverse countersink cutting assembly that defines a depth of cut for a reverse countersink in a working surface of the workpiece encircling the through hole; (2) at least temporarily attaching the reverse countersink cutting assembly on a working side of the workpiece to a pull shank assembly on an accessible side of the workpiece by way of the through hole to form a reverse countersinking assembly defining a longitudinal axis extending from an assembly distal end associated with the pull shank assembly to an assembly proximal end associated with the reverse countersink cutting assembly; and (3) rotating the pull shank assembly and the countersink cutting head while pulling the pull shank assembly away from the accessible side of the workpiece to cut the reverse countersink in the working surface that encircles the through hole to the depth of cut defined by the reverse countersink cutting assembly.

Other examples of the disclosed reverse countersink cutting assemblies, reverse countersinking assemblies and methods for reverse countersinking a through hole in a workpiece will become apparent from the following detailed description, the accompanying drawings and the appended claims.

DETAILED DESCRIPTION

The various examples of reverse countersink cutting assemblies, reverse countersinking assemblies and methods for reverse countersinking a through hole in a workpiece disclosed herein provide techniques that allow, for example, reverse countersinking of a drain hole in an aft fairing of an aircraft. The techniques reverse countersink the drain hole and remove sharp edges. In this case, the drain hole is in a limited space. Use of the reverse countersink cutting assemblies and reverse countersinking assemblies permit reverse countersinking in such limited spaces as well as confined spaces. The reverse countersink cutting assemblies implement a compact design suitable for use in limited and confined spaces. The reverse countersink cutting assemblies disclosed herein also provide a built-in depth of cut stop for precise and consistent countersinking.

Figure 1:
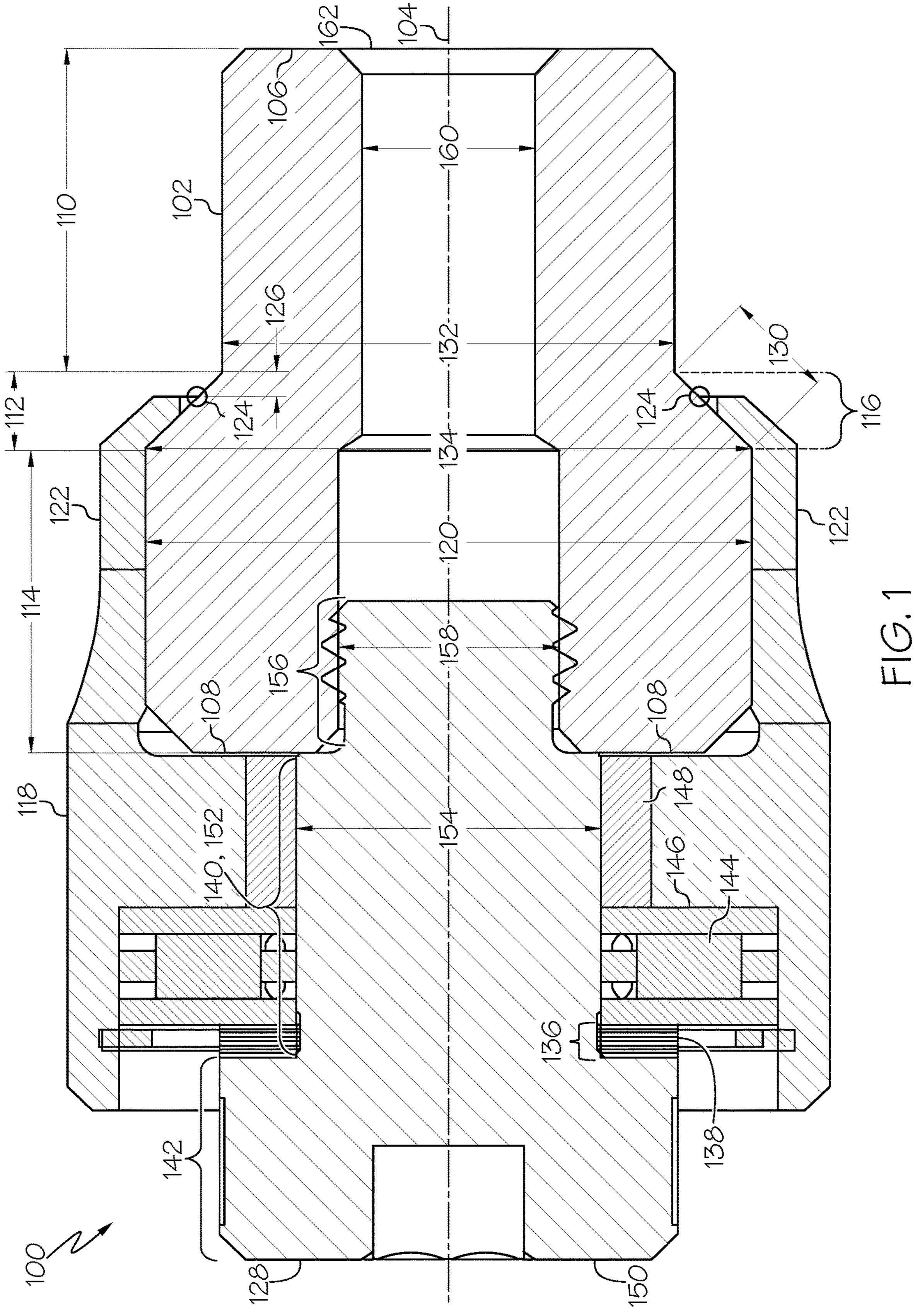
FIG. 1 is a cross-sectional view of an example of a reverse countersink cutting assembly.
Figure 2:
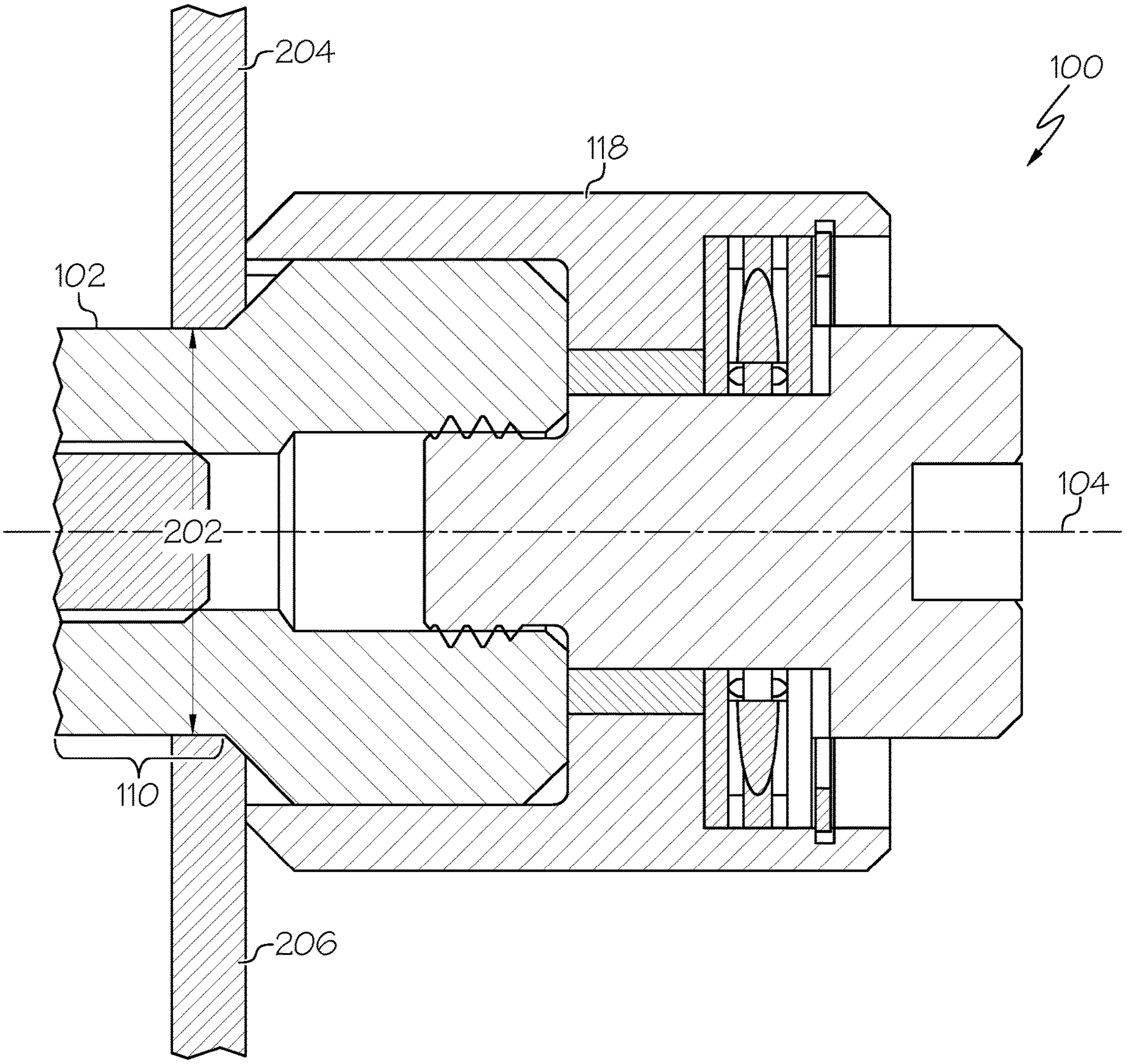
FIG. 2 is another cross-sectional view of the reverse countersink cutting assembly of FIG. 1 in which the assembly is inserted in an example of a through hole for reverse countersinking in an example of a workpiece.
Figure 3:
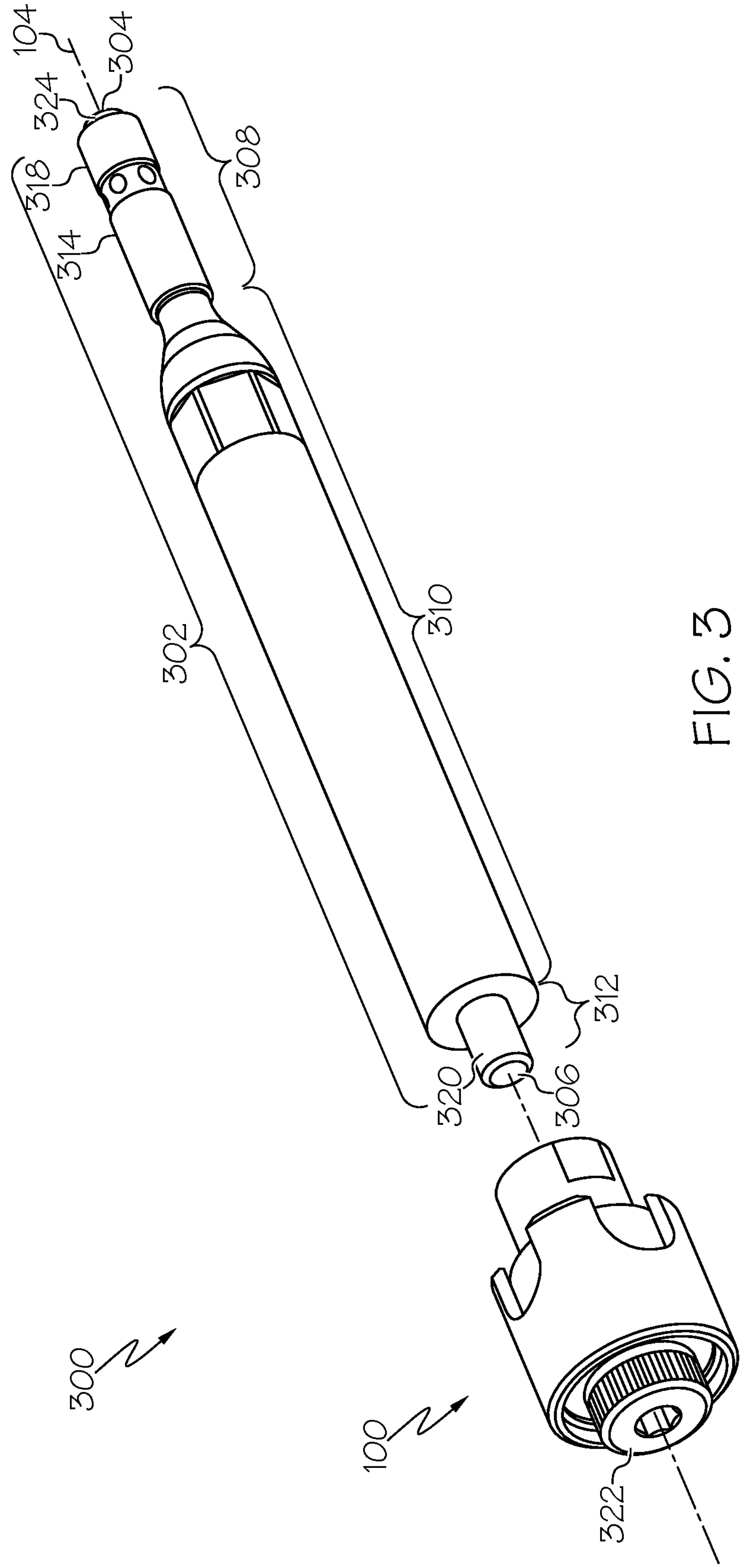
FIG. 3 is a partially exploded view of an example of a reverse countersinking assembly.
Figure 4:
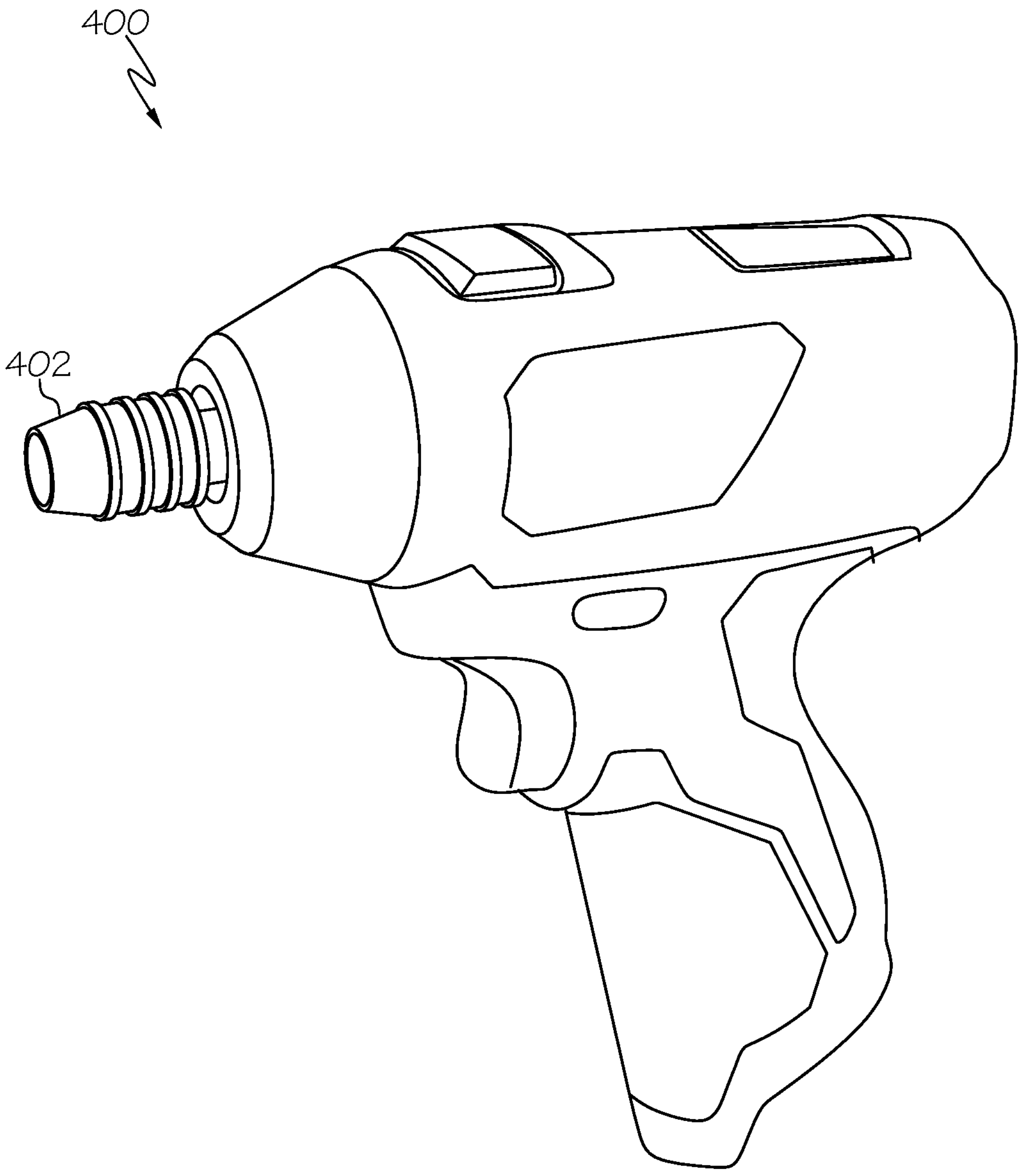
FIG. 4 is a perspective view of an example of a rotational drive assembly for rotating the reverse countersinking assembly of FIG. 3.
Figure 5:
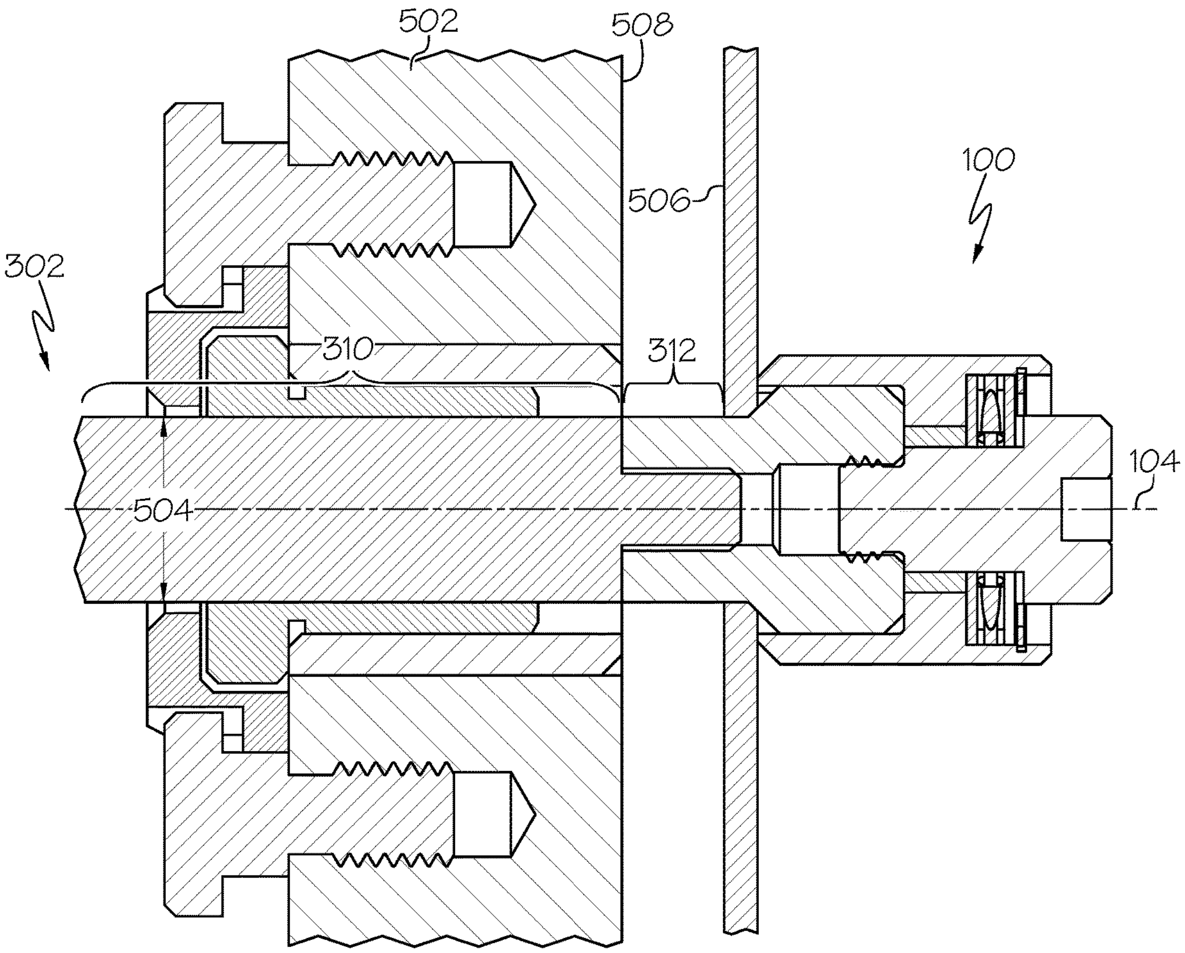
FIG. 5 is a cross-sectional view of the reverse countersinking assembly of FIG. 3 in which the reverse countersink cutting assembly and a pull shank assembly are interconnected via an example of a through hole for reverse countersinking in an example of a workpiece.
Figure 13:
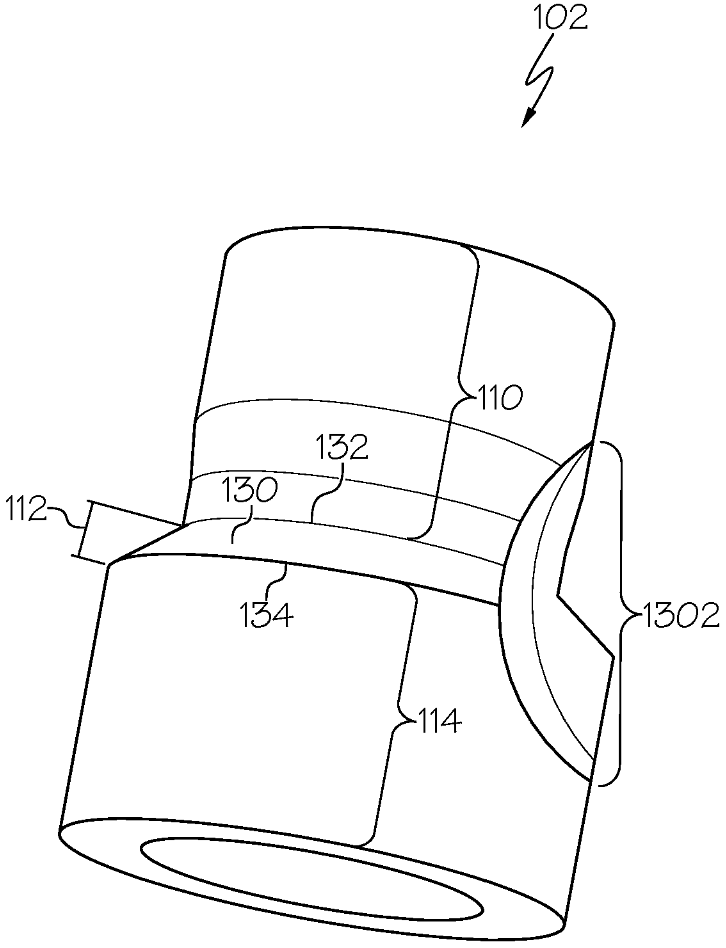
FIG. 13 is a side perspective view of an example of a countersink cutting head for the reverse countersink cutting assembly of FIG. 1.
Figure 14:
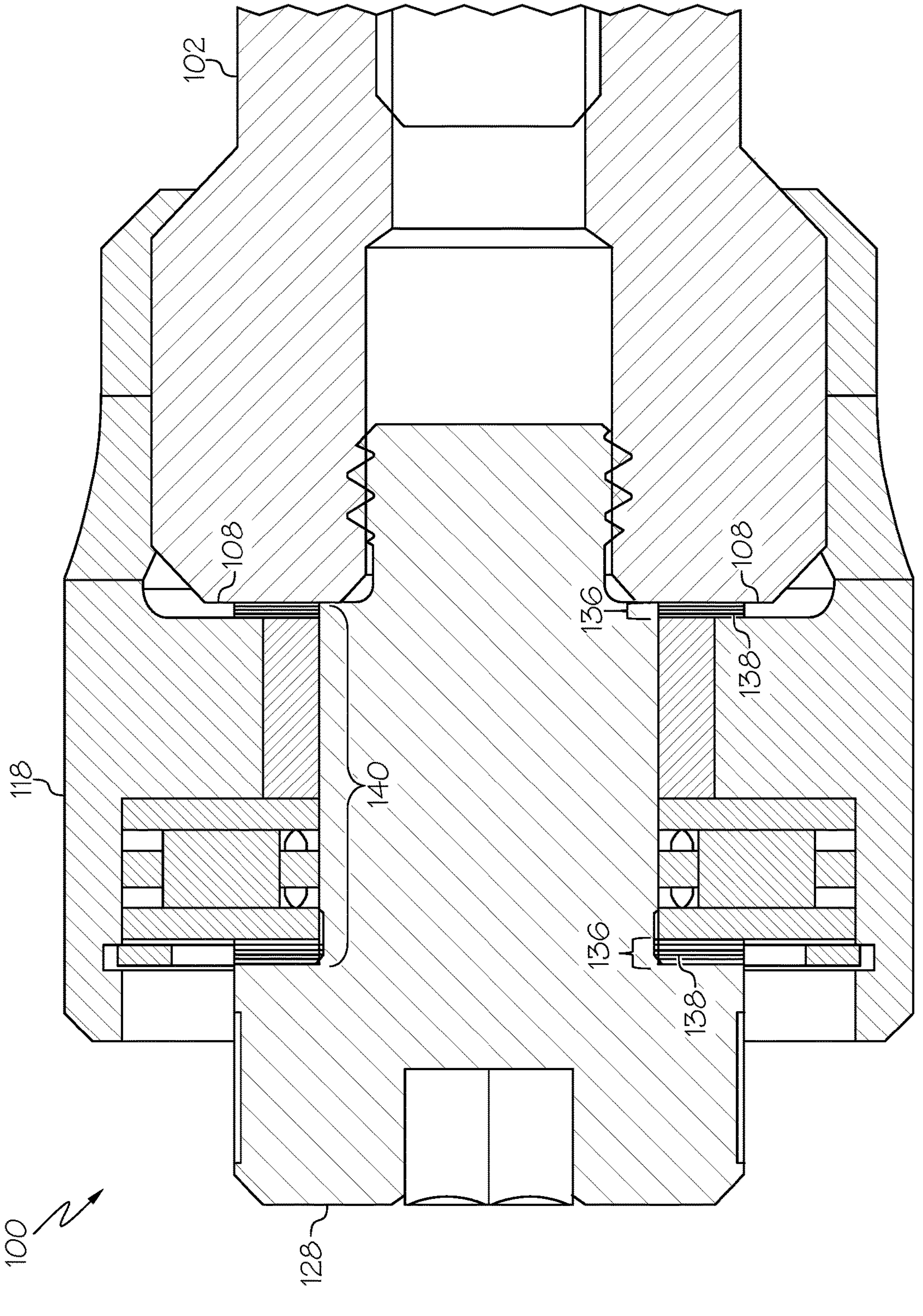
FIG. 14 is a cross-sectional view of the reverse countersink cutting assembly of FIG. 1 configured to a different depth of cut for the reverse countersinking.

Referring generally to FIGS. 1, 2, 13 and 14, by way of examples, the present disclosure is directed to a reverse countersink cutting assembly 100. FIG. 1 provides a cross-sectional view of an example of the reverse countersink cutting assembly 100. FIG. 2 is another cross-sectional view of the reverse countersink cutting assembly 100 that shows the assembly inserted in an example of a through hole 202 for reverse countersinking in an example of a workpiece 204. FIG. 3 discloses an example of a reverse countersinking assembly 300 that includes the reverse countersink cutting assembly 100. FIG. 4 discloses an example of a rotational drive assembly 400 for rotating the reverse countersinking assembly 300. FIG. 5 provides a cross-sectional view of an example of the reverse countersinking assembly 300 in which the reverse countersink cutting assembly 100 and a pull shank assembly 302 are assembled via an example of the through hole 202 for reverse countersinking in the workpiece 204. FIG. 13 discloses an example of a countersink cutting head 102 for the reverse countersink cutting assembly 100. FIG. 14 discloses another example of the reverse countersink cutting assembly 100 configured to a different depth of cut for the reverse countersinking.

With reference again to FIGS. FIGS. 1, 2, 13 and 14, in one or more examples, a reverse countersink cutting assembly 100 includes a countersink cutting head 102, a depth stop sleeve 118 and a fastener 128. The countersink cutting head 102 defines a longitudinal axis 104 extending from a cutter distal end 106 through a cutter proximal end 108. The countersink cutting head 102 includes a cutter distal portion 110, a cutting portion 112 and a cutter proximal portion 114 axially spaced along the longitudinal axis 104. The cutting portion 112 defines a countersink cutting range 116. The depth stop sleeve 118 includes a central cavity 120 that coaxially receives the cutter proximal portion 114 of the countersink cutting head 102. The depth stop sleeve 118 also includes one or more projections 122 that extend coaxially along the longitudinal axis 104 to a predetermined point 124 within the countersink cutting range 116 to define a depth of cut 126 for the reverse countersink cutting assembly 100. The fastener 128 that retains the depth stop sleeve 118 on the countersink cutting head 102.

In another example of the reverse countersink cutting assembly 100, the countersink cutting head 102 includes a carbide steel alloy, a tungsten carbide alloy, a tungsten metal, a tungsten titanium carbide alloy, a high-speed steel alloy or any other suitable material.

In yet another example of the reverse countersink cutting assembly 100, the cutter distal portion 110 of the countersink cutting head 102 is sized for insertion in a through hole 202 of a workpiece 204 in which the through hole 202 has a predetermined inner diameter. In a further example, the predetermined inner diameter of the through hole 202 is approximately ½ inch, approximately 7/16 inch, approximately ⅜ inch, approximately 5/16 inch, approximately ¼ inch, approximately 7/32 inch, approximately 3/16 inch, approximately 5/32 inch, approximately ⅛ inch, approximately 3/32 inch or any other suitable inner diameter.

In still another example of the reverse countersink cutting assembly 100, the cutting portion 112 of the countersink cutting head 102 includes a cutting surface 130 that rises from a narrower outer diameter 132 proximate the cutter distal portion 110 to a wider outer diameter 134 proximate the cutter proximal portion 114 in relation to the longitudinal axis 104.

In a further example, the cutting surface 130 includes one or more flutes 1302. In an even further example, the one or more flutes 1302 include one flute, two flutes, three flutes, four flutes, five flutes, six flutes or any other suitable number of flutes. In another even further example, the cutting surface 130 includes multiple flutes 1302 radially spaced in relation to the longitudinal axis.

In another further example, the cutting surface 130 rises at a predetermined countersink angle. In an even further example, the predetermined countersink angle includes an angle that ranges between approximately 38 degree and approximately 42 degrees, approximately 38 degrees and approximately 47 degrees, approximately 43 degrees and approximately 47 degrees, approximately 43 degrees and approximately 52 degrees, approximately 38 degrees and approximately 52 degrees or any other suitable range for the countersink angle. In another even further example, the predetermined countersink angle includes an approximately 45-degree countersink angle. In yet another even further example, the countersink cutting range 116 is based at least in part on the predetermined countersink angle and half of a difference between the wider outer diameter 134 of the cutting portion 112 and the narrower outer diameter 132 of the cutting portion 112.

In still another example of the reverse countersink cutting assembly 100, the countersink cutting range 116 is approximately 0.060 inches to approximately 0.180 inches, 0.060 inches to approximately 0.150 inches, 0.060 inches to approximately 0.120 inches, 0.060 inches to approximately 0.090 inches or any other suitable range for the countersink cutting range 116.

In still yet another example of the reverse countersink cutting assembly 100, the one or more projections 122 contact a working surface 206 of a workpiece 204 to limit further reverse countersinking of the working surface 206 surrounding a through hole 202 in the workpiece 204 to the depth of cut 126 associated with the predetermined point 124 within the countersink cutting range 116.

In another example of the reverse countersink cutting assembly 100, the depth of cut 126 for the reverse countersink cutting assembly 100 is adjustable such that a depth of cut range is defined for the reverse countersink cutting assembly 100. In a further example, the depth of cut range is approximately 0.020 inches to approximately 0.080 inches, approximately 0.020 inches to approximately 0.070 inches, approximately 0.020 inches to approximately 0.060 inches, approximately 0.020 inches to approximately 0.050 inches, approximately 0.020 inches to approximately 0.040 inches, approximately 0.020 inches to approximately 0.030 inches or any other suitable range for the depth of cut 126. In another further example, the reverse countersink cutting assembly 100 also includes a set 136 of shims 138 positioned around a shank portion 140 of the fastener 128 and disposed between a head portion 142 of the fastener 128 and the depth stop sleeve 118 to define a minimum depth of cut 126 within the depth of cut range. In an even further example, removal of one or more shim 138 from the set 136 of shims 138 increases the depth of cut 126 above the minimum depth of cut 126 and removal of the set 136 of shims 138 defines a maximum depth of cut 126 within the depth of cut range. In an even yet further example, positioning the one or more shim 138 removed from the set 136 of shims 138 around the shank portion 140 of the fastener 128 and between the cutter proximal end 108 of the countersink cutting head 102 and an adjacent portion of the depth stop sleeve 118 maintains stability of the depth stop sleeve 118 after being retained on the countersink cutting head 102 by the fastener 128. In another even further example, a thickness range for at least one shim 138 of the set 136 of shims 138 is approximately 0.005 inches to approximately 0.060 inches, approximately 0.010 inches to approximately 0.055 inches, approximately 0.016 inches to approximately 0.050 inches, approximately 0.030 inches to approximately 0.045 inches or any other suitable range for the shim thickness.

In yet another example of the reverse countersink cutting assembly 100, rotation of the depth stop sleeve 118 about the longitudinal axis 104 is independent of rotation of the countersink cutting head 102 and the fastener 128 about the longitudinal axis 104. In a further reverse countersink cutting assembly 100 also includes a thrust bearing 144 and a sleeve bearing 148. The thrust bearing 144 positioned around a shank portion 140 of the fastener 128 and disposed between a head portion 142 of the fastener 128 and an end portion 146 of the depth stop sleeve 118. The sleeve bearing 148 positioned around the shank portion 140 of the fastener 128, laterally disposed between the shank portion 140 and the depth stop sleeve 118 and axially disposed between the thrust bearing 144 and the cutter proximal end 108 of the countersink cutting head 102. The thrust bearing 144 and the sleeve bearing 148 enable independent rotation of the depth stop sleeve 118 and the countersink cutting head 102. The fastener 128 rotating along with the countersink cutting head 102.

In still another example of the reverse countersink cutting assembly 100, the fastener 128 includes a shoulder bolt 150. In a further example, the shoulder bolt 150 includes a head portion 142, a shoulder portion 152 and a threaded portion 156. The head portion 142 sized to retain the depth stop sleeve 118 on the countersink cutting head 102. The shoulder portion 152 sized to fit within a through bore 154 of the depth stop sleeve 118. The threaded portion 156 for threaded engagement with a threaded bore 158 in the cutter proximal portion 114 of the countersink cutting head 102.

Referring generally to FIGS. 1-5, 13 and 14, by way of examples, the present disclosure is directed to a reverse countersinking assembly 300. FIG. 1 provides a cross-sectional view of an example of a reverse countersink cutting assembly 100. FIG. 2 is another cross-sectional view of the reverse countersink cutting assembly 100 that shows the assembly inserted in an example of a through hole 202 for reverse countersinking in an example of a workpiece 204. FIG. 3 discloses an example of the reverse countersinking assembly 300 that includes the reverse countersink cutting assembly 100. FIG. 4 discloses an example of a rotational drive assembly 400 for rotating the reverse countersinking assembly 300. FIG. 5 provides a cross-sectional view of an example of the reverse countersinking assembly 300 in which the reverse countersink cutting assembly 100 and a pull shank assembly 302 are assembled via an example of the through hole 202 for reverse countersinking in the workpiece 204. FIG. 13 discloses an example of a countersink cutting head 102 for the reverse countersink cutting assembly 100. FIG. 14 discloses another example of the reverse countersink cutting assembly 100 configured to a different depth of cut for the reverse countersinking.

With reference again to FIGS. FIGS. 1-5, 13 and 14, in one or more examples, a reverse countersinking assembly 300 includes a pull shank assembly 302 and a reverse countersink cutting assembly 100. The pull shank assembly 302 defines a longitudinal axis 104 extending from a shank distal end 304 through a shank proximal end 306. The pull shank assembly 302 includes a shank distal portion 308, a shank extension portion 310 and a shank proximal portion 312 axially spaced along the longitudinal axis 104. The reverse countersink cutting assembly 100 is at least temporarily attached to the pull shank assembly 302. The reverse countersink cutting assembly 100 includes a countersink cutting head 102, a depth stop sleeve 118 and a fastener 128. The countersink cutting head includes a cutter distal end 106, a cutter distal portion 110, a cutting portion 112, a cutter proximal portion 114 and a cutter proximal end 108 axially spaced along the longitudinal axis 104. The cutting portion 112 defines a countersink cutting range 116. The cutter distal end 106 includes a first central cavity 160 that receives the shank proximal portion 312 of the pull shank assembly 302. The depth stop sleeve 118 includes a second central cavity 120 that receives the cutter proximal portion 114 of the countersink cutting head 102. The depth stop sleeve 118 also includes one or more projections 122 that extend coaxially along the longitudinal axis 104 to a predetermined point 124 within the countersink cutting range 116 to define a depth of cut 126 for the reverse countersink cutting assembly 100. The fastener 128 retains the depth stop sleeve 118 on the countersink cutting head 102.

In another example of the reverse countersinking assembly 300, the shank distal portion 308 of the pull shank assembly 302 includes an interface 314 to a rotational drive assembly 400. In a further example, the interface 314 includes a quick-disconnect connector 316 that mates with a compatible quick-disconnect connector 402 on the rotational drive assembly 400. In another further example, the interface 314 includes a stub 318 that interfaces with a gripping connector that coaxially receives and tightens onto the stub 318.

In yet another example of the reverse countersinking assembly 300, the shank proximal portion 312 of the pull shank assembly 302 is sized for insertion in a through hole 202 of a workpiece 204 in which the through hole 202 has a predetermined inner diameter. In a further example, the predetermined inner diameter of the through hole 202 is approximately $\frac{1}{2}$ inch, approximately $\frac{7}{16}$ inch, approximately $\frac{3}{8}$ inch, approximately $\frac{5}{16}$ inch, approximately $\frac{1}{4}$ inch, approximately $\frac{7}{32}$ inch, approximately $\frac{3}{16}$ inch, approximately $\frac{5}{32}$ inch, approximately $\frac{1}{8}$ inch, approximately $\frac{3}{32}$ inch or any other suitable inner diameter for the through hole 202.

In still another example of the reverse countersinking assembly 300, the shank proximal end 306 of the pull shank assembly 302 includes an interface 320 to the countersink cutting head 102. In a further example, the interface 320 on the shank proximal end 306 of the pull shank assembly 302 includes a threaded stud, a square drive with a locking and quick release mechanism, a hex drive with a locking and quick release mechanism or any other suitable interface to the countersink cutting head 102.

In still yet another example of the reverse countersinking assembly 300, the first central cavity 160 at the cutter distal end 106 of the countersink cutting head 102 includes an interface 162 to the pull shank assembly 302. In a further example, the interface 162 to the pull shank assembly 302 includes a cylindrical cavity with internal threads to receive a threaded stud, a square cavity to receive a square drive with a locking and quick release mechanism, a hex cavity to receive a hex drive with a locking and quick release mechanism or any other suitable interface to the pull shank assembly 302.

In another example of the reverse countersinking assembly 300, the countersink cutting head 102 includes a carbide steel alloy, a tungsten carbide alloy, a tungsten metal, a tungsten titanium carbide alloy, a high-speed steel alloy or any other suitable material.

In yet another example of the reverse countersinking assembly 300, the cutting portion 112 of the countersink cutting head 102 in the reverse countersink cutting assembly 100 includes a cutting surface 130 that rises from a narrower outer diameter 132 proximate the cutter distal portion 110 to a wider outer diameter 134 proximate the cutter proximal portion 114 in relation to the longitudinal axis 104. In a further example, the cutting surface 130 includes one or more flutes 1302. In another further example, the cutting surface 130 rises at a predetermined countersink angle.

In still another example of the reverse countersinking assembly 300, the one or more projections 122 contact a working surface 206 of a workpiece 204 to limit further reverse countersinking of the working surface 206 surrounding a through hole 202 in the workpiece 204 to the depth of cut 126 associated with the predetermined point 124 within the countersink cutting range 116.

In still yet another example of the reverse countersinking assembly 300, the depth of cut 126 for the reverse countersink cutting assembly 100 is adjustable such that a depth of cut range is defined for the reverse countersink cutting assembly 100. In a further example of the reverse countersinking assembly 300, the reverse countersink cutting assembly 100 also includes a set 136 of shims 138 positioned around a shank portion 140 of the fastener 128 and disposed between a head portion 142 of the fastener 128 and the depth stop sleeve 118 to define a minimum depth of cut 126 within the depth of cut range. In an even further example, removal of one or more shim 138 from the set 136 of shims 138 increases the depth of cut 126 above the minimum depth of cut 126 and removal of the set 136 of shims 138 defines a maximum depth of cut 126 within the depth of cut range. In another even further example, positioning the one or more shim 138 removed from the set 136 of shims 138 around the shank portion 140 of the fastener 128 and between the cutter proximal end 108 of the countersink cutting head 102 and an adjacent portion of the depth stop sleeve 118 maintains stability of the depth stop sleeve 118 after being retained on the countersink cutting head 102 by the fastener 128.

In another example of the reverse countersinking assembly 300, rotation of the depth stop sleeve 118 about the longitudinal axis 104 is independent of rotation of the countersink cutting head 102 and the fastener 128 about the longitudinal axis 104. In a further example, of the reverse countersinking assembly 300, the reverse countersink cutting assembly 100 also includes a thrust bearing 144 and a sleeve bearing 148. The thrust bearing 144 positioned around a shank portion 140 of the fastener 128 and disposed between a head portion 142 of the fastener 128 and an end portion 146 of the depth stop sleeve 118. The sleeve bearing 148 positioned around the shank portion 140 of the fastener 128, laterally disposed between the shank portion 140 and the depth stop sleeve 118 and axially disposed between the thrust bearing 144 and the cutter proximal end 108 of the countersink cutting head 102. The thrust bearing 144 and the sleeve bearing 148 enable independent rotation of the depth stop sleeve 118 and the countersink cutting head 102. The fastener 128 rotating along with the countersink cutting head 102.

In yet another example of the reverse countersinking assembly 300, the fastener 128 of the reverse countersink cutting assembly 100 includes a shoulder bolt 150. The shoulder bolt 150 includes a head portion 142, a shoulder portion 152 and a threaded portion 156. The head portion 142 sized to retain the depth stop sleeve 118 on the countersink cutting head 102. The shoulder portion 152 sized to fit within a through bore 154 of the depth stop sleeve 118. The threaded portion 156 for threaded engagement with a threaded bore 158 in the cutter proximal portion 114 of the countersink cutting head 102.

In still another example, the reverse countersinking assembly 300 also includes a drill jig 502. The drill jig 502 includes an aperture 504 coaxially extending along the longitudinal axis 104. The aperture 504 sized to clear the shank proximal portion 312 and the shank extension portion 310 of the pull shank assembly 302 without obstruction. In a further example, the aperture 504 is oriented in the drill jig 502 to align with a through hole 202 of a workpiece 204 when the drill jig 502 is secured to an accessible surface 506 of the workpiece 204. In an even further example, an adjacent surface 508 of the drill jig 502 is customized to fit the accessible surface 506 of the workpiece 204 to which the drill jig 502 is secured. In another even further example, the accessible surface 506 of the workpiece 204 to which the drill jig 502 is secured includes a two-dimensional portion, a contoured portion, a double-contoured portion, a sloping portion, a curved portion, a geometrically-shaped portion or any other suitable shape for any portion of the accessible surface 506.

Referring generally to FIGS. 1-14, by way of examples, the present disclosure is directed to a method 600, 900, 1000 for reverse countersinking a through hole 202 in a workpiece. FIG. 1 provides a cross-sectional view of an example of a reverse countersink cutting assembly 100. FIG. 2 is another cross-sectional view of the reverse countersink cutting assembly 100 that shows the assembly inserted in an example of a through hole 202 for reverse countersinking in an example of a workpiece 204. FIG. 3 discloses an example of a reverse countersinking assembly 300 that includes the reverse countersink cutting assembly 100. FIG. 4 discloses an example of a rotational drive assembly 400 for rotating the reverse countersinking assembly 300. FIG. 5 provides a cross-sectional view of an example of the reverse countersinking assembly 300 in which the reverse countersink cutting assembly 100 and a pull shank assembly 302 are assembled via an example of the through hole 202 for reverse countersinking in the workpiece 204.

Figure 6:
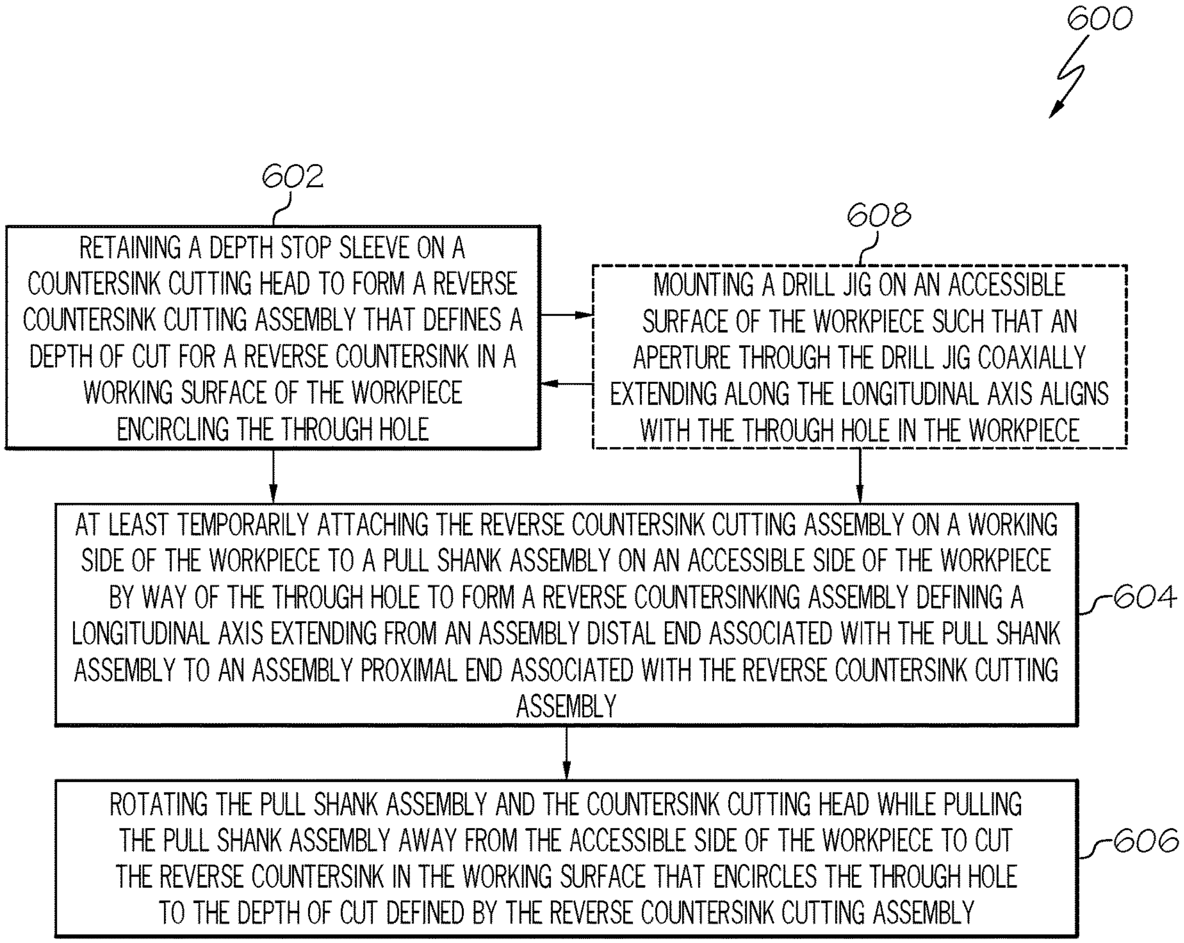
FIG. 6 is a flow diagram of an example of a method for reverse countersinking a through hole in a workpiece.
Figure 7:
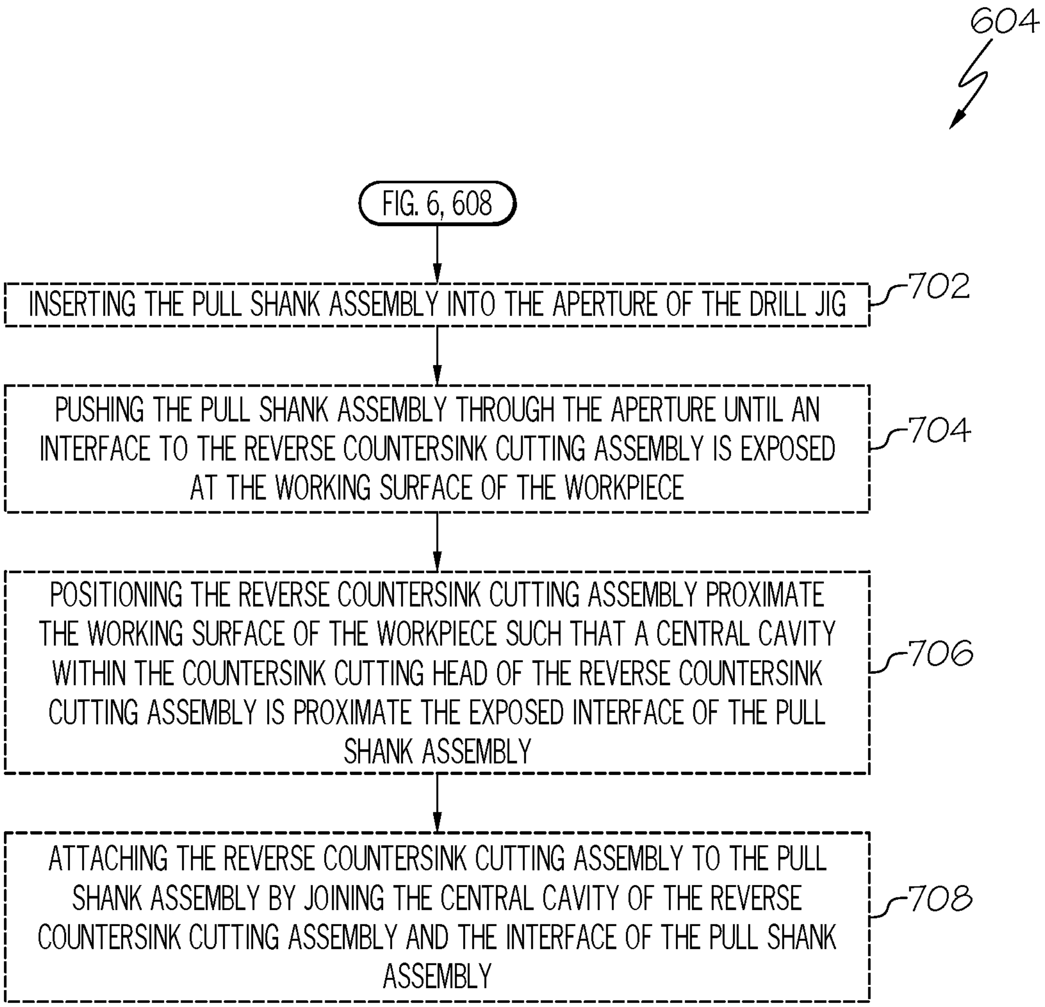
FIG. 7, in combination with FIG. 6, is a flow diagram of another example of a method for reverse countersinking a through hole in a workpiece.
Figure 8:
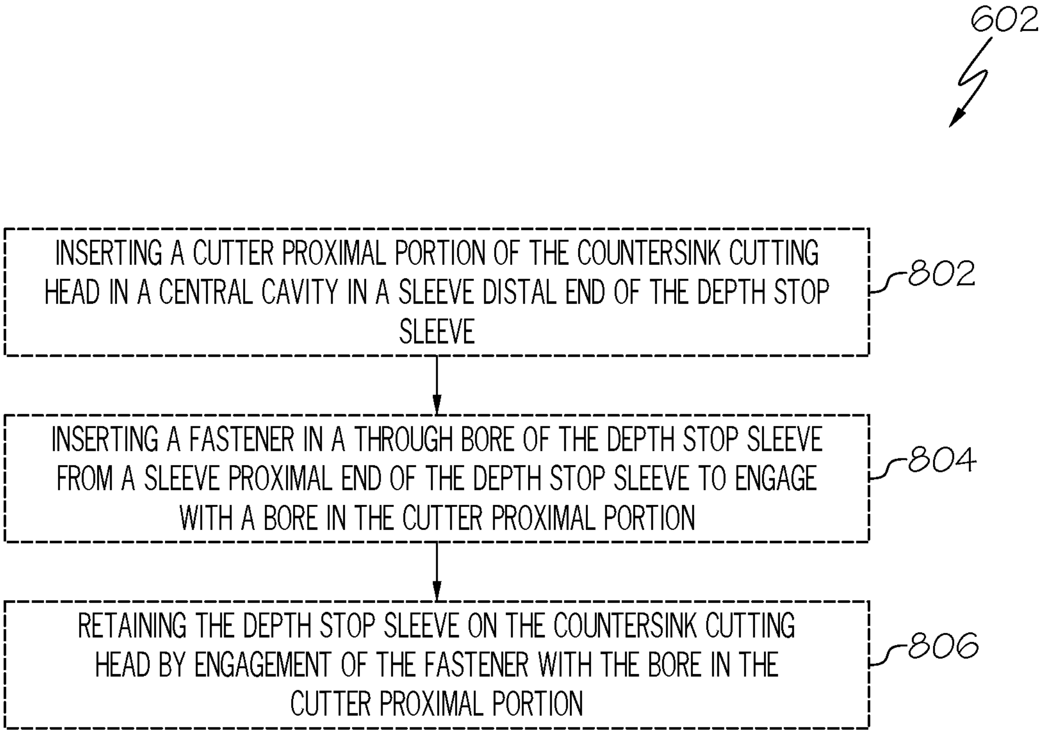
FIG. 8 is a flow diagram of an example of retaining a depth stop sleeve on a countersink cutting head from the method of FIG. 6.
Figure 9:
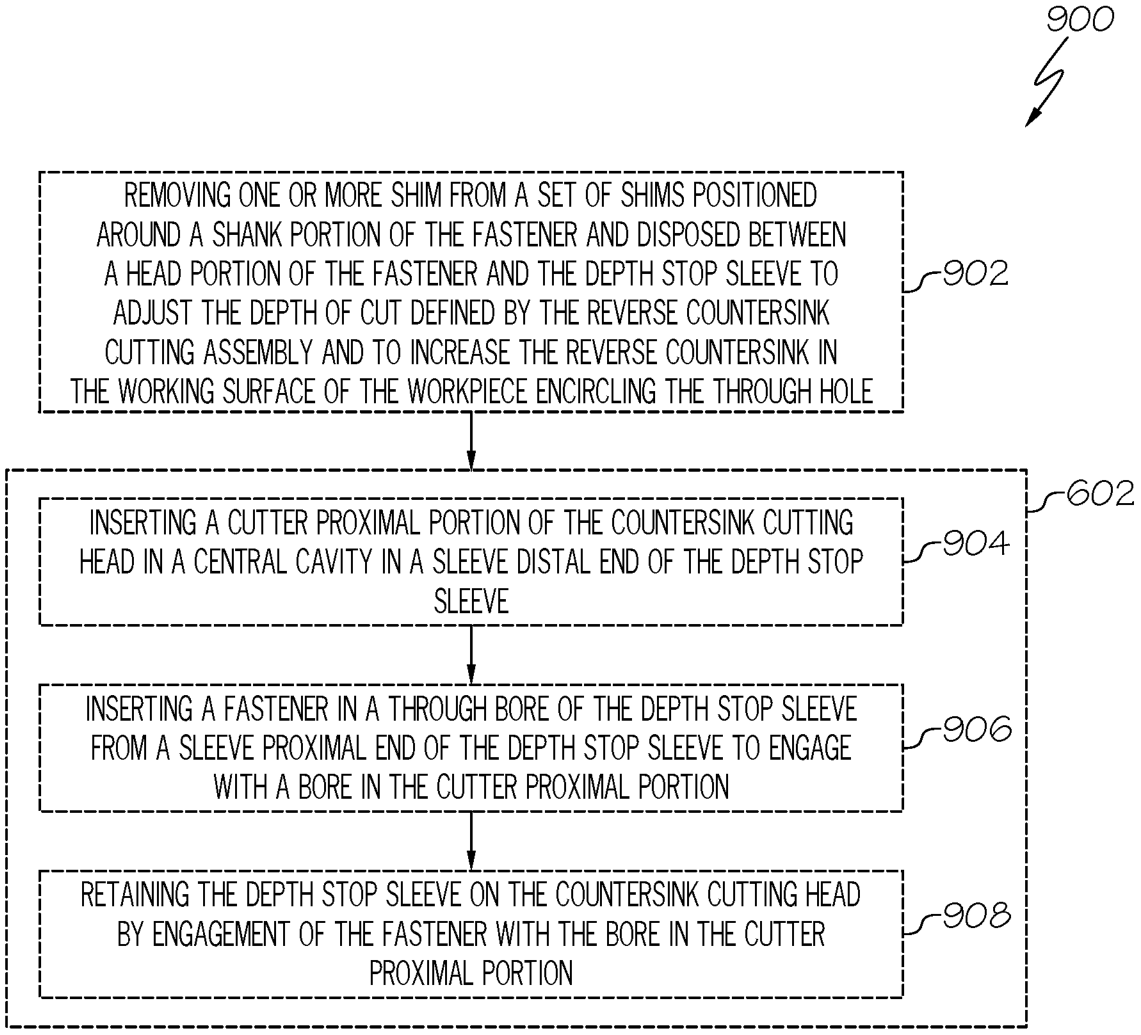
FIG. 9, in combination with FIG. 6, is a flow diagram of yet another example of a method for reverse countersinking a through hole in a workpiece.
Figure 10:
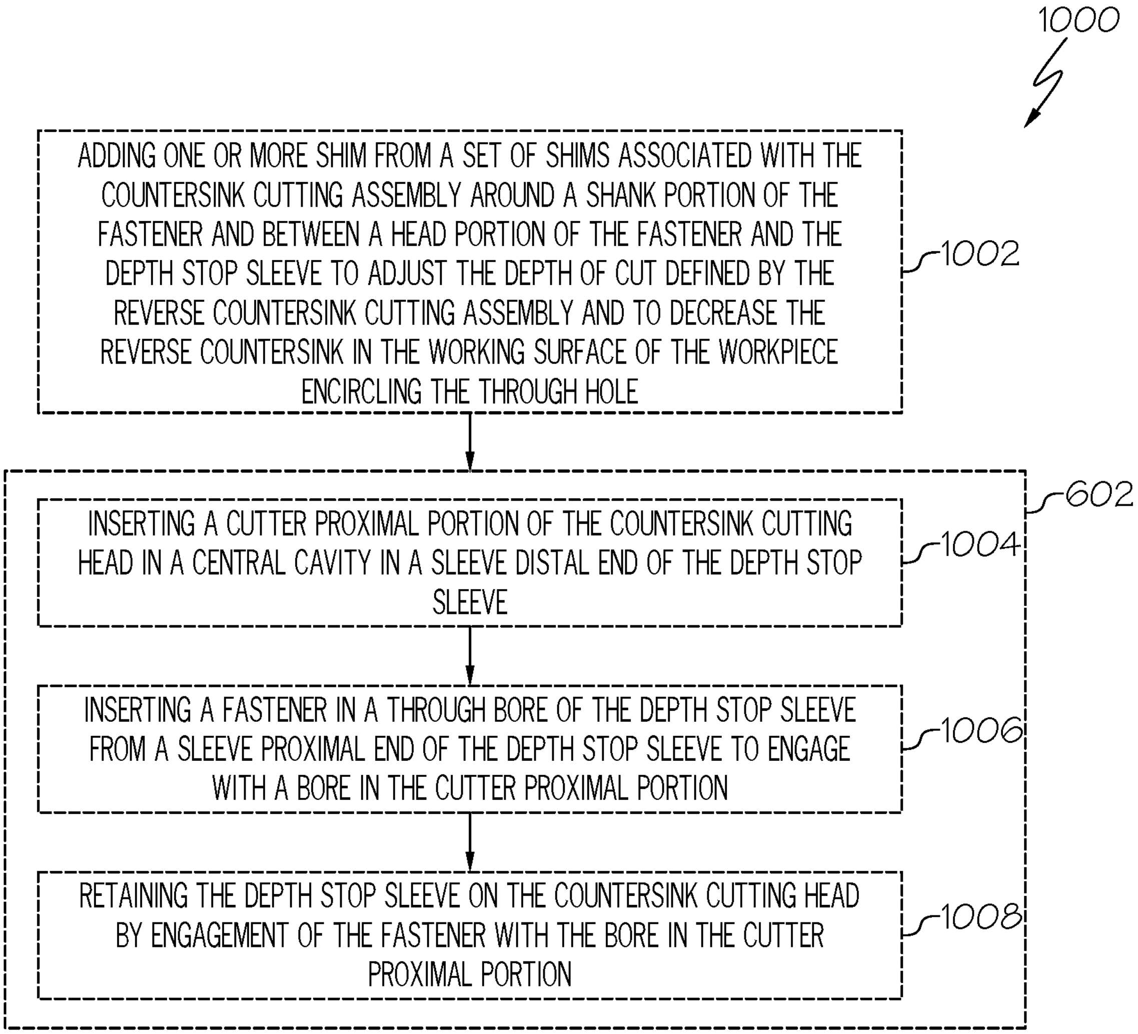
FIG. 10, in combination with FIG. 6, is a flow diagram of still another example of a method for reverse countersinking a through hole in a workpiece.
Figure 11:
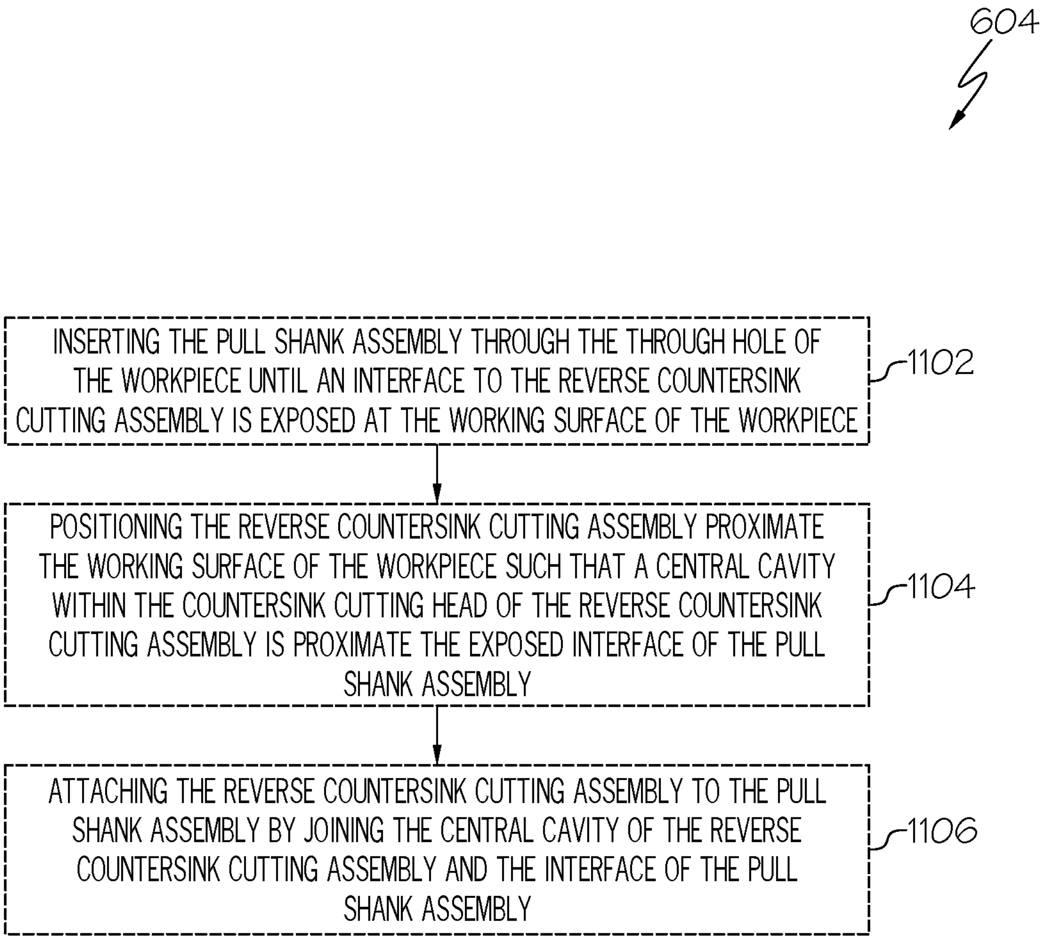
FIG. 11 is a flow diagram of an example of attaching the reverse countersink cutting assembly to a pull shank assembly from the method of FIG. 6.
Figure 12:
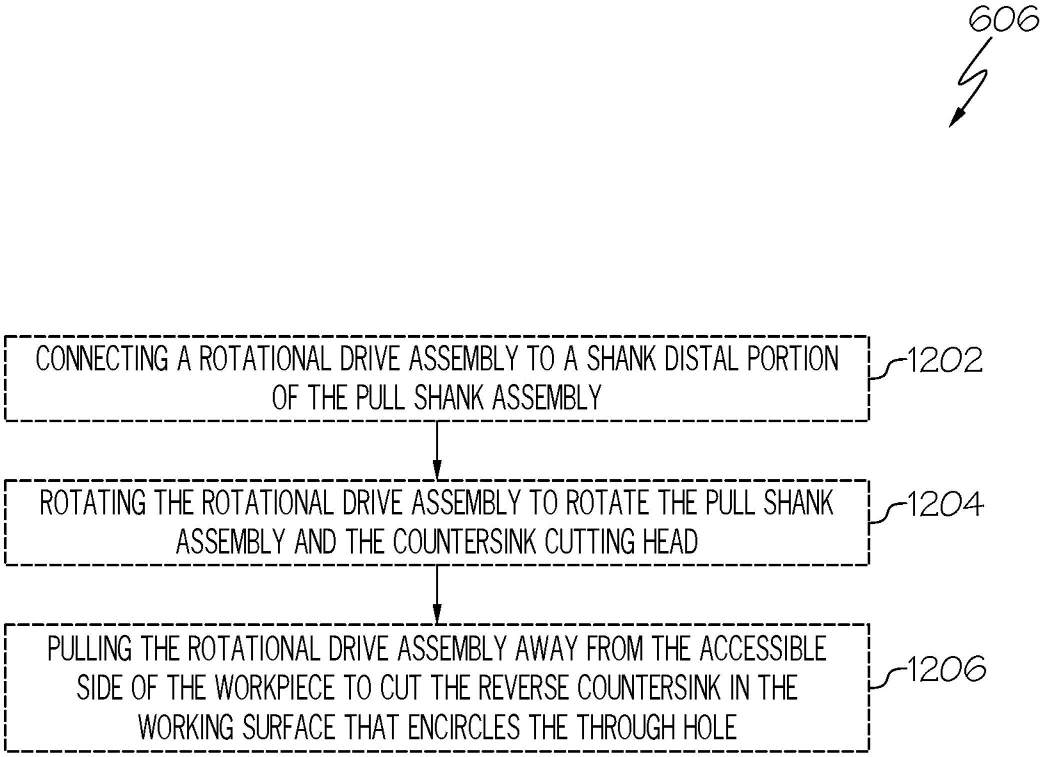
FIG. 12 is a flow diagram of an example of rotating the pull shank assembly and the countersink cutting head from the method of FIG. 6.

FIG. 6 discloses an example of the method 600 for reverse countersinking a through hole 202 in a workpiece 204. FIG. 7, in combination with FIG. 6, discloses another example of the method 600. FIG. 8 discloses an example of retaining 602 a depth stop sleeve on a countersink cutting head from the method 600 of FIG. 6. FIG. 9, in combination with FIG. 6, discloses an example of the method 900 for reverse countersinking a through hole 202 in a workpiece 204. FIG. 10, in combination with FIG. 6, discloses an example of the method 1000 for reverse countersinking a through hole 202 in a workpiece 204. FIG. 11 discloses an example of attaching 604 the reverse countersink cutting assembly to a pull shank assembly from the method 600 of FIG. 6. FIG. 12 discloses an example of rotating 606 the pull shank assembly and the countersink cutting head from the method 600 of FIG. 6.

FIG. 13 discloses an example of a countersink cutting head 102 for the reverse countersink cutting assembly 100. FIG. 14 discloses another example of the reverse countersink cutting assembly 100 configured to a different depth of cut for the reverse countersinking.

With reference again to FIGS. 1-3 and 5-8, in one or more examples, a method 600 (see FIG. 6) for reverse countersinking a through hole 202 in a workpiece 204 includes retaining 602 a depth stop sleeve 118 on a countersink cutting head 102 to form a reverse countersink cutting assembly 100 that defines a depth of cut 126 for a reverse countersink in a working surface 206 of the workpiece 204 encircling the through hole 202. At 604, the reverse countersink cutting assembly 100 on a working side of the workpiece 204 is at least temporarily attached to a pull shank assembly 302 on an accessible side of the workpiece 204 by way of the through hole 202 to form a reverse countersinking assembly 300 defining a longitudinal axis 104 extending from an assembly distal end 324 associated with the pull shank assembly 302 to an assembly proximal end 322 associated with the reverse countersink cutting assembly 100. At 606, the pull shank assembly 302 and the countersink cutting head 102 is rotated while pulling the pull shank assembly 302 away from the accessible side of the workpiece 204 to cut the reverse countersink in the working surface 206 that encircles the through hole 202 to the depth of cut 126 defined by the reverse countersink cutting assembly 100.

In another example, the method 600 also includes mounting 608 a drill jig 502 on an accessible surface 506 of the workpiece 204 such that an aperture 504 through the drill jig 502 coaxially extending along the longitudinal axis 104 aligns with the through hole 202 in the workpiece 204. In a further example of the method 600, the at least temporarily attaching 604 of the reverse countersink cutting assembly 100 to the pull shank assembly 302 includes inserting 702 (see FIG. 7) the pull shank assembly 302 into the aperture 504 of the drill jig 502. At 704, the pull shank assembly 302 is pushed through the aperture 504 until an interface 320 to the reverse countersink cutting assembly 100 is exposed at the working surface 206 of the workpiece 204. At 706, the reverse countersink cutting assembly 100 is positioned proximate the working surface 206 of the workpiece 204 such that a central cavity 160 within the countersink cutting head 102 of the reverse countersink cutting assembly 100 is proximate the exposed interface 320 of the pull shank assembly 302. At 708, the reverse countersink cutting assembly 100 is attached to the pull shank assembly 302 by joining the central cavity 160 of the reverse countersink cutting assembly 100 and the interface 320 of the pull shank assembly 302.

In yet another example of the method 600, the retaining 602 of the depth stop sleeve 118 on the countersink cutting head 102 includes inserting 802 (see FIG. 8) a cutter proximal portion 114 of the countersink cutting head 102 in a central cavity 120 in a sleeve distal end of the depth stop sleeve 118. At 804, a fastener 128 is inserted in a through bore 154 of the depth stop sleeve 118 from a sleeve proximal end of the depth stop sleeve 118 to engage with a bore in the cutter proximal portion 114. At 806, the depth stop sleeve 118 is retained on the countersink cutting head 102 by engagement of the fastener 128 with the bore in the cutter proximal portion 114. In a further example, the fastener 128 includes a threaded portion 156 and the bore in the cutter proximal portion 114 of the countersink cutting head 102 includes a threaded bore 158 such that the engagement of the fastener 128 with the bore is a threaded engagement.

With reference again to FIGS. 1, 2, 6 and 9, in one or more examples, a method 900 (see FIG. 9) for reverse countersinking a through hole 202 in a workpiece 204 includes the method 600 of FIG. 6. Prior to the method 600, the method 900 includes removing 902 one or more shim 138 from a set 136 of shims 138 positioned around a shank portion 140 of a fastener 128 and disposed between a head portion 142 of the fastener 128 and the depth stop sleeve 118 to adjust the depth of cut 126 defined by the reverse countersink cutting assembly 100 and to increase the reverse countersink in the working surface 206 of the workpiece 204 encircling the through hole 202.

In another example, the method 900 also includes positioning the one or more shim 138 removed from the set 136 of shims 138 around the shank portion 140 of the fastener 128 and between the cutter proximal end 108 of the countersink cutting head 102 and an adjacent portion of the depth stop sleeve 118 to maintain stability of the depth stop sleeve 118 after being retained on the countersink cutting head 102 by the fastener 128.

In yet another example, the method 900 continues from 902 to 602. In the method 900, the retaining 602 of the depth stop sleeve 118 on the countersink cutting head 102 includes inserting 904 a cutter proximal portion 114 of the countersink cutting head 102 in a central cavity 120 in a sleeve distal end of the depth stop sleeve 118. At 906, a fastener 128 is inserted in a through bore 154 of the depth stop sleeve 118 from a sleeve proximal end of the depth stop sleeve 118 to engage with a bore in the cutter proximal portion 114. At 908, the depth stop sleeve 118 is retained on the countersink cutting head 102 by engagement of the fastener 128 with the bore in the cutter proximal portion 114.

With reference again to FIGS. 1, 2, 6 and 10, in one or more examples, a method 1000 (see FIG. 10) for reverse countersinking a through hole 202 in a workpiece 204 includes the method 600 of FIG. 6. Prior to the method 600, the method 1000 includes adding 1002 one or more shim 138 from a set 136 of shims 138 associated with the countersink cutting assembly around a shank portion 140 of the fastener 128 and between a head portion 142 of the fastener 128 and the depth stop sleeve 118 to adjust the depth of cut 126 defined by the reverse countersink cutting assembly 100 and to decrease the reverse countersink in the working surface 206 of the workpiece 204 encircling the through hole 202.

In another example, the method 1000 continues from 1002 to 602. In the method 1000, the retaining 602 of the depth stop sleeve 118 on the countersink cutting head 102 includes inserting 1004 a cutter proximal portion 114 of the countersink cutting head 102 in a central cavity 120 in a sleeve distal end of the depth stop sleeve 118. At 1006, a fastener 128 is inserted in a through bore 154 of the depth stop sleeve 118 from a sleeve proximal end of the depth stop sleeve 118 to engage with a bore in the cutter proximal portion 114. At 1008, the depth stop sleeve 118 is retained on the countersink cutting head 102 by engagement of the fastener 128 with the bore in the cutter proximal portion 114.

With reference again to FIGS. 1-4, 6, 11 and 12, in another example of the method 600, the at least temporarily attaching 604 of the reverse countersink cutting assembly 100 to the pull shank assembly 302 includes inserting 1102 (see FIG. 11) the pull shank assembly 302 through the through hole 202 of the workpiece 204 until an interface 320 to the reverse countersink cutting assembly 100 is exposed at the working surface 206 of the workpiece 204. At 1104, the reverse countersink cutting assembly 100 is positioned proximate the working surface 206 of the workpiece 204 such that a central cavity within the countersink cutting head 102 of the reverse countersink cutting assembly 100 is proximate the exposed interface 320 of the pull shank assembly 302. At 1106, the reverse countersink cutting assembly 100 is attached to the pull shank assembly 302 by joining the central cavity of the reverse countersink cutting assembly 100 and the interface 320 of the pull shank assembly 302. In a further example, the interface 320 of the pull shank assembly 302 includes a threaded stud, a square drive with a locking and quick release mechanism, a hex drive with a locking and quick release mechanism or any other suitable interface for the pull shank assembly 302. In another further example, the central cavity of the reverse countersink cutting assembly 100 includes a cylindrical cavity with internal threads to receive a threaded stud, a square cavity to receive a square drive with a locking and quick release mechanism, a hex cavity to receive a hex drive with a locking and quick release mechanism or any other suitable central cavity for the reverse countersink cutting assembly 100.

In yet another example of the method 600, the rotating 606 of the pull shank assembly 302 and the countersink cutting head 102 includes connecting 1202 (see FIG. 12) a rotational drive assembly 400 to a shank distal portion 308 of the pull shank assembly 302. At 1204, the rotational drive assembly 400 rotated to rotate the pull shank assembly 302 and the countersink cutting head 102. At 1206, the rotational drive assembly 400 is pulled away from the accessible side of the workpiece 204 to cut the reverse countersink in the working surface 206 that encircles the through hole 202. In a further example, the shank distal portion 308 of the pull shank assembly 302 includes a quick-disconnect connector 316 that mates with a compatible quick-disconnect connector 402 on the rotational drive assembly 400. In another further example, the shank distal portion 308 of the pull shank assembly 302 includes a stub 318 that interfaces with a gripping connector that coaxially receives and tightens onto the stub 318.

In still another example of the method 600, rotation of the pull shank assembly 302 and the countersink cutting head 102 is independent of rotation of the depth stop sleeve 118 during the rotating of the pull shank assembly 302 and the countersink cutting head 102. In a further example, a thrust bearing 144 and a sleeve bearing 148 in the reverse countersink cutting assembly 100 enable independent rotation of the countersink cutting head 102 and the depth stop sleeve 118.

Examples of the reverse countersink cutting assembly 100, reverse countersinking assembly 300 and methods 600, 900, 1000 for reverse countersinking a through hole in a workpiece may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may be implemented to produce components and other equipment in various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word “a” or “an” should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to “example” means that one or more feature, structure, element, component, characteristic and/or operational step described in connection with the example is included in at least one aspect, embodiment and/or implementation of the subject matter according to the present disclosure. Thus, the phrases “an example,” “another example,” “one or more examples,” and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component or hardware “configured to” perform a specified function is indeed capable of performing the specified function without any alteration, rather than merely having potential to perform the specified function after further modification. In other words, the system, apparatus, device, structure, article, element, component or hardware “configured to” perform a specified function is specifically selected, created, implemented, utilized, programmed and/or designed for the purpose of performing the specified function. As used herein, "configured to" denotes existing characteristics of a system, apparatus, structure, article, element, component or hardware that enable the system, apparatus, structure, article, element, component or hardware to perform the specified function without further modification. For purposes of this disclosure, a system, apparatus, device, structure, article, element, component or hardware described as being "configured to" perform a particular function may additionally or alternatively be described as being "adapted to" and/or as being "operative to" perform that function.

Unless otherwise indicated, the terms "first," "second," "third," etc. are used herein merely as labels and are not intended to impose ordinal, positional or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1-5, 13 and 14, referred to above, may represent functional elements, features or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1-5, 13 and 14, referred to above, need be included in every example and not all elements, features and/or components described herein are necessarily depicted in each illustrative example. Accordingly, some of the elements, features and/or components described and illustrated in FIGS. 1-5, 13 and 14 may be combined in various ways without the need to include other features described and illustrated in FIGS. 1-5, 13 and 14, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1-5, 13 and 14, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1-5, 13 and 14 and such elements, features and/or components may not be discussed in detail herein with reference to each of FIGS. 1-5, 13 and 14. Similarly, all elements, features and/or components may not be labeled in each of FIGS. 1-5, 13 and 14, but reference numerals associated therewith may be utilized herein for consistency.

In FIGS. 6-12, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 6-12 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage or characteristic described in connection with an example is included in at least one example. Thus, discussion of features, advantages and similar language used throughout the present disclosure may, but does not necessarily, refer to the same example.

Figure 15:
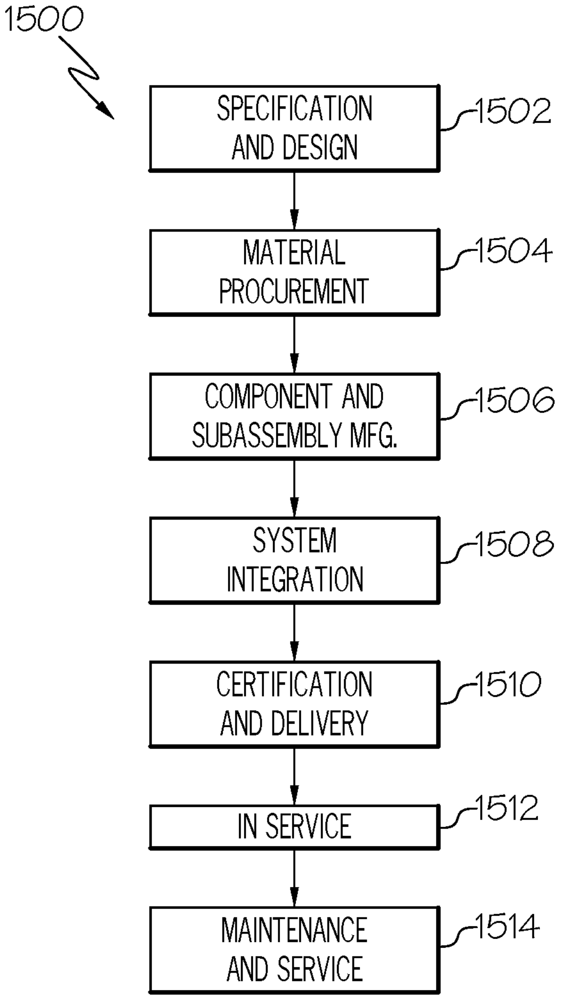
FIG. 15 is a block diagram of aircraft production and service methodology that implements one or more of the examples of methods for reverse countersinking a through hole in a workpiece disclosed herein to produce or maintain components of the aircraft.
Figure 16:
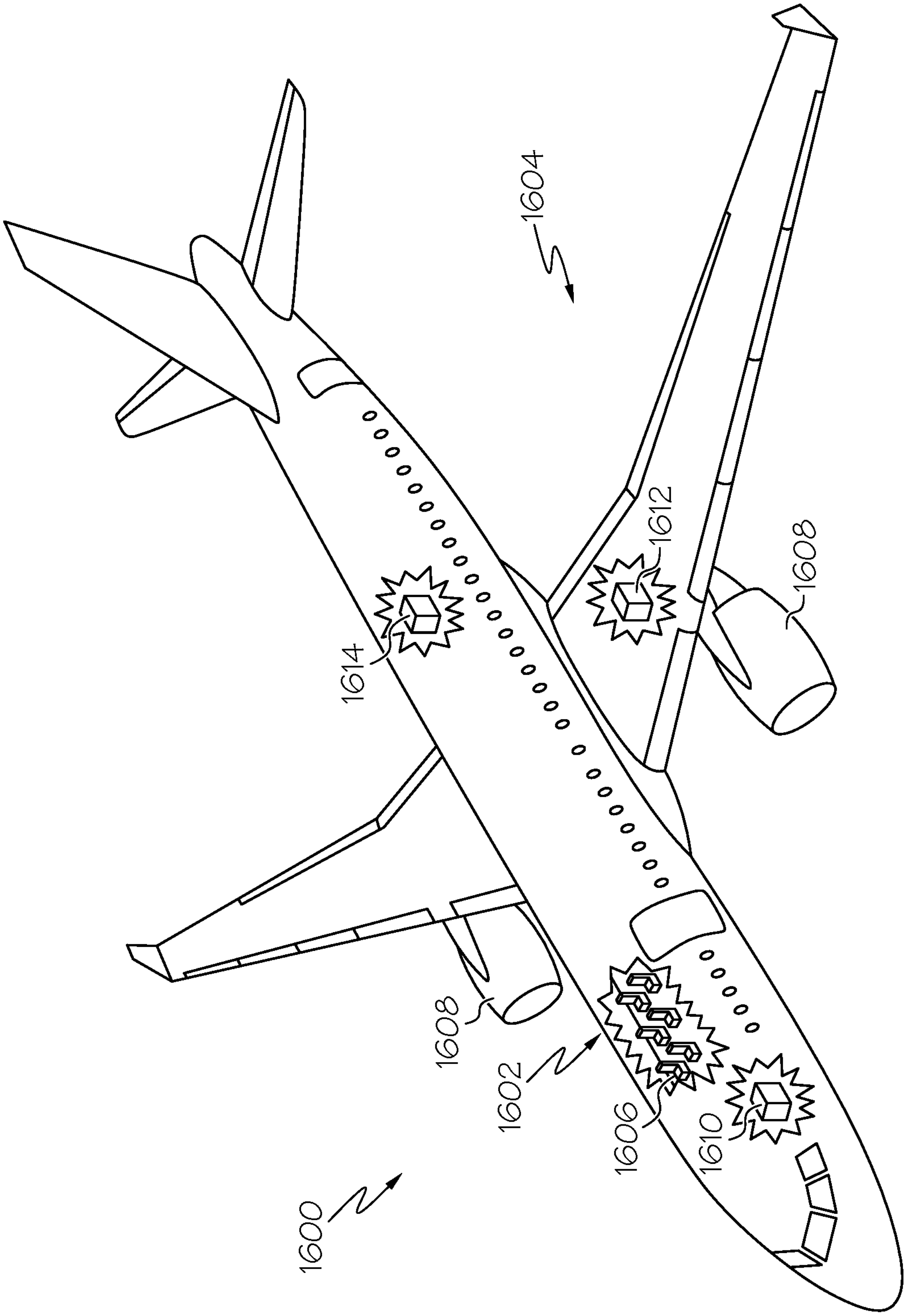
FIG. 16 is a schematic illustration of an aircraft that incorporates one or more examples of components produced or maintained using reverse countersink cutting assemblies and reverse countersinking assemblies disclosed herein.

Examples of the subject matter disclosed herein may be described in the context of aircraft manufacturing and service method 1500 as shown in FIG. 15 and aircraft 1600 as shown in FIG. 16. In one or more examples, the disclosed methods and systems for associating test data for a part under test with an end item coordinate system may be used in aircraft manufacturing. During pre-production, the service method 1500 may include specification and design (block 1502) of aircraft 1600 and material procurement (block 1504). During production, component and subassembly manufacturing (block 1506) and system integration (block 1508) of aircraft 1600 may take place. Thereafter, aircraft 1600 may go through certification and delivery (block 1510) to be placed in service (block 1512). While in service, aircraft 1600 may be scheduled for routine maintenance and service (block 1514). Routine maintenance and service may include modification, reconfiguration, refurbishment, etc. of one or more systems of aircraft 1600.

Each of the processes of the service method 1500 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 16, aircraft 1600 produced by the service method 1500 may include airframe 1602 with a plurality of high-level systems 1604 and interior 1606. Examples of high-level systems 1604 include one or more of propulsion system 1608, electrical system 1610, hydraulic system 1612 and environmental system 1614. Any number of other systems may be included. Although an aerospace example is shown, the principles disclosed herein may be applied to other industries, such as the automotive industry. Accordingly, in addition to aircraft 1600, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 1500. For example, components or subassemblies corresponding to component and subassembly manufacturing (block 1506) may be fabricated or manufactured in a manner similar to components or subassemblies produced while aircraft 1600 is in service (block 1512). Also, one or more examples of the system(s), method(s) or combination thereof may be utilized during production stages (block 1506 and block 1508), for example, by substantially expediting assembly of or reducing the cost of aircraft 1600. Similarly, one or more examples of the system or method realizations or a combination thereof, may be utilized, for example and without limitation, while aircraft 1600 is in service (block 1512) and/or during maintenance and service (block 1514).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the reverse countersink cutting assemblies 100, reverse countersinking assemblies 300 and methods 600, 900, 1000 for reverse countersinking a through hole in a workpiece have been shown and described, modifications may occur to those skilled in the art upon reading the specification. The present application includes such modifications and is limited only by the scope of the claims.

What is claimed is:

1. A reverse countersink cutting assembly, comprising:

a countersink cutting head defining a longitudinal axis extending from a cutter distal end through a cutter proximal end, the countersink cutting head comprising a cutter distal portion, a cutting portion and a cutter proximal portion axially spaced along the longitudinal axis, the cutting portion defining a countersink cutting range;

a depth stop sleeve comprising a central cavity that coaxially receives the cutter proximal portion of the countersink cutting head and further comprising one or more projections that extend coaxially along the longitudinal axis to a predetermined point within the countersink cutting range to define a depth of cut for the reverse countersink cutting assembly; and a fastener that retains the depth stop sleeve on the countersink cutting head, wherein the fastener comprises a threaded portion for threaded engagement with the countersink cutting head.

2. The reverse countersink cutting assembly of claim 1, the cutting portion of the countersink cutting head comprising:

a cutting surface that rises from a narrower outer diameter proximate the cutter distal portion to a wider outer diameter proximate the cutter proximal portion in relation to the longitudinal axis.

3. The reverse countersink cutting assembly of claim 2 wherein the cutting surface comprises one or more flutes.

4. The reverse countersink cutting assembly of claim 2 wherein the cutting surface rises at a predetermined countersink angle.

5. The reverse countersink cutting assembly of claim 4 wherein the predetermined countersink angle comprises an angle that ranges between at least one of approximately 38 degree and approximately 42 degrees, approximately 38 degrees and approximately 47 degrees, approximately 43 degrees and approximately 47 degrees, approximately 43 degrees and approximately 52 degrees and approximately 38 degrees and approximately 52 degrees.

6. The reverse countersink cutting assembly of claim 4 wherein the countersink cutting range is based at least in part on the predetermined countersink angle and half of a difference between the wider outer diameter of the cutting portion and the narrower outer diameter of the cutting portion.

7. The reverse countersink cutting assembly of claim 1 wherein the countersink cutting range comprises at least one of approximately 0.060 inches to approximately 0.180 inches, 0.060 inches to approximately 0.150 inches, 0.060 inches to approximately 0.120 inches and 0.060 inches to approximately 0.090 inches.

8. The reverse countersink cutting assembly of claim 1 wherein the one or more projections contact a working surface of a workpiece to limit further reverse countersinking of the working surface surrounding a through hole in the workpiece to the depth of cut associated with the predetermined point within the countersink cutting range.

9. The reverse countersink cutting assembly of claim 1 wherein the depth of cut for the reverse countersink cutting assembly is adjustable such that a depth of cut range is defined for the reverse countersink cutting assembly.

10. The reverse countersink cutting assembly of claim 9 wherein the depth of cut range comprises at least one of approximately 0.020 inches to approximately 0.080 inches, approximately 0.020 inches to approximately 0.070 inches, approximately 0.020 inches to approximately 0.060 inches, approximately 0.020 inches to approximately 0.050 inches, approximately 0.020 inches to approximately 0.040 inches and approximately 0.020 inches to approximately 0.030 inches.

11. The reverse countersink cutting assembly of claim 9, further comprising:

a set of shims positioned around a shank portion of the fastener and disposed between a head portion of the fastener and the depth stop sleeve to define a minimum depth of cut within the depth of cut range.

12. The reverse countersink cutting assembly of claim 11 wherein removal of one or more shim from the set of shims increases the depth of cut above the minimum depth of cut and removal of the set of shims defines a maximum depth of cut within the depth of cut range.

13. The reverse countersink cutting assembly of claim 12 wherein positioning the one or more shim removed from the set of shims around the shank portion of the fastener and between the cutter proximal end of the countersink cutting head and an adjacent portion of the depth stop sleeve maintains stability of the depth stop sleeve after being retained on the countersink cutting head by the fastener.

14. The reverse countersink cutting assembly of claim 11 wherein a thickness range for at least one shim of the set of shims comprises at least one of approximately 0.005 inches to approximately 0.060 inches, approximately 0.010 inches to approximately 0.055 inches, approximately 0.016 inches to approximately 0.050 inches and approximately 0.030 inches to approximately 0.045 inches.

15. The reverse countersink cutting assembly of claim 1 wherein rotation of the depth stop sleeve about the longitudinal axis is independent of rotation of the countersink cutting head and the fastener about the longitudinal axis.

16. The reverse countersink cutting assembly of claim 15, further comprising:

a thrust bearing positioned around a shank portion of the fastener and disposed between a head portion of the fastener and an end portion of the depth stop sleeve; and a sleeve bearing positioned around the shank portion of the fastener, laterally disposed between the shank portion and the depth stop sleeve and axially disposed between the thrust bearing and the cutter proximal end of the countersink cutting head, and wherein the thrust bearing and the sleeve bearing enable independent rotation of the depth stop sleeve and the countersink cutting head, the fastener rotating along with the countersink cutting head.

17. The reverse countersink cutting assembly of claim 1, the fastener comprising a shoulder bolt.

18. The reverse countersink cutting assembly of claim 17, the shoulder bolt comprising:

a head portion sized to retain the depth stop sleeve on the countersink cutting head;

a shoulder portion sized to fit within a through bore of the depth stop sleeve; and a threaded portion for threaded engagement with a threaded bore in the cutter proximal portion of the countersink cutting head.

19. A reverse countersinking assembly, comprising:

a pull shank assembly defining a longitudinal axis extending from a shank distal end through a shank proximal end, the pull shank assembly comprising a shank distal portion, a shank extension portion and a shank proximal portion axially spaced along the longitudinal axis; and a reverse countersink cutting assembly at least temporarily attached to the pull shank assembly, the reverse countersink cutting assembly comprising:

a countersink cutting head comprising a cutter distal end, a cutter distal portion, a cutting portion, a cutter proximal portion and a cutter proximal end axially spaced along the longitudinal axis, the cutting portion defining a countersink cutting range, the cutter distal end comprising a first central cavity that receives the shank proximal portion of the pull shank assembly;

a depth stop sleeve comprising a second central cavity that receives the cutter proximal portion of the countersink cutting head and further comprising one or more projections that extend coaxially along the longitudinal axis to a predetermined point within the countersink cutting range to define a depth of cut for the reverse countersink cutting assembly; and a fastener that retains the depth stop sleeve on the countersink cutting head, wherein the fastener comprises a threaded portion for threaded engagement with the countersink cutting head.

20. A method for reverse countersinking a through hole in a workpiece, the method comprising:

retaining a depth stop sleeve on a countersink cutting head with a fastener to form a reverse countersink cutting assembly that defines a depth of cut for a reverse countersink in a working surface of the workpiece encircling the through hole, wherein the fastener comprises a threaded portion for threaded engagement with the countersink cutting head;

at least temporarily attaching the reverse countersink cutting assembly on a working side of the workpiece to a pull shank assembly on an accessible side of the workpiece by way of the through hole to form a reverse countersinking assembly defining a longitudinal axis extending from an assembly distal end associated with the pull shank assembly to an assembly proximal end associated with the reverse countersink cutting assembly; and rotating the pull shank assembly and the countersink cutting head while pulling the pull shank assembly away from the accessible side of the workpiece to cut the reverse countersink in the working surface that encircles the through hole to the depth of cut defined by the reverse countersink cutting assembly.

* * * * *